2,917,358

URANOUS IODATE AS A CARRIER FOR PLUTONIUM

Daniel R. Miller, Richmond, Glenn T. Seaborg, Berkeley, and Stanley G. Thompson, Richmond, Calif., assignors to the United States of America as represented by the United States Atomic Energy Commission No Drawing. Application September 20, 1948
Serial No. 50,246

12 Claims. (Cl. 23—14.5)

This invention relates to a method of separating plutonium from an aqueous solution and more particularly to a method for separating plutonium in the reduced state from a solution in which it is present in a very dilute concentration.

Reference herein to any of the elements is to be understood as denoting the element generically whether in its free state or in the form of a compound unless otherwise indicated in the context.

It is an object of this invention to provide precipitation methods for the separation of plutonium from aqueous solutions containing ionic plutonium in the reduced state.

An additional object of this invention is to provide a suitable precipitation method for separating the plutonium from aqueous solutions containing plutonium, uranium, and fission products and for simultaneously effecting at least a partial decontamination of the plutonium with respect to said uranium and fission products.

Other objects and advantages of this invention will be apparent from the following description.

Plutonium which has been formed by the neutron-irradiation of uranium is normally contaminated with uranium and fission products. These fission products are isotopes of elements having atomic numbers from about 32 to about 64, and are formed by the nuclear fission of uranium and other heavy radioactive elements. Aqueous solutions derived from neutron-irradiated uranium normally contain a considerable concentration of unreacted uranium and very small concentrations of plutonium and of fission products. The plutonium concentration is generally substantially below 1% of the weight of the unreacted uranium and may even be less than one part per million parts of uranium. The recovery of plutonium from such solutions or from dilute waste solutions or the like cannot easily be effected by direct precipitation of an insoluble plutonium compound. If a dilute solution of plutonium contains substantial amounts of contaminating elements, concentration by evaporation will often result in partial separation of impurities with an accompanying loss of plutonium. It is therefore desirable to effect the separation of plutonium directly from the dilute solution.

In order to separate plutonium from a solution of such low concentration that a plutonium compound will not precipitate by itself, it is necessary to employ an auxiliary insoluble "carrier" to effect removal of the plutonium from the solution. The insoluble carrier may be introduced into the solution as the preformed finely-divided solid, but is preferably precipitated directly in the solution from which the plutonium is to be carried. The mechanism of the carrying of plutonium from solution is not fully understood, but mechanisms which may be factors in the carrying are the incorporation of plutonium ions into the crystal carrier lattice and the surface adsorption of plutonium ions.

The term "carrier" as used herein and in the appended claims is to be understood as signifying a substantially insoluble, solid, finely-divided compound capable of ionizing to yield at least one inorganic cation and to yield at least one anion which constitutes an ionic component of a compound which contains the ion to be carried, said latter compound being not substantially more soluble than said finely-divided compound in the same solution.

We have discovered that plutonium in the reduced state, i.e., having a valence not greater than +4, and preferably in the +4 state, may be carried from an aqueous acidic solution with a uranous iodate carrier precipitate. It will be apparent that uranous iodate constitutes a plutonium carrier in accordance with the above definition. Thus, uranous iodate is capable of ionizing to form a $U^{+4}$ cation and a $IO_3^-$ anion. The latter is an ionic component of the insoluble compound, $Pu(IO_3)_4$.

The ratio of carrier to plutonium may vary over a wide range, depending particularly upon the plutonium concentration of the original solution. Weight ratios ranging from 10,000:1 to 10:1 or lower may be used, but the ratio will generally fall within the range from 1,000:1 to 100:1. The carrying procedure may be effected by any of the known techniques for effecting adequate contact of liquids with insoluble solids. In the case of a preformed carrier the finely-divided solid uranous iodate may be agitated with the solution or the solution may be continuously passed through fixed beds of the carrier. As previously pointed out, however, the preferred procedure is to precipitate the uranous iodate directly in the plutonium solution. This may be effected by adding the ions in any order but it is generally preferred to add the uranous ion first and then the iodate ion. Uranous iodate may be precipitated in a solution containing a large concentration of uranyl ion without affecting the uranyl ion concentration so that a uranous iodate carrier may be used as the carrier for plutonium from an aqueous solution formed by dissolving neutron-irradiated uranium in nitric acid. The iodates of cesium, rubidium, lanthanum, and the trivalent rare earths are soluble in an aqueous acidic solution so that the carrying of plutonium ions in a valence state not greater than +4 from an aqueous acidic solution of neutron-irradiated uranium will result in the substantial decontamination of plutonium from uranyl and the other aforementioned ions. The efficiency of uranous iodate as a carrier for plutonium is quite high, with better than 90% of the plutonium normally being carried by a uranous iodate precipitate. Substantially quantitative removal of plutonium from solution, however, may be secured by repeating the precipitation step several times. The precipitation step is normally carried out in a solution of an inorganic acid. Nitric acid or hydrochloric acid have been found to be preferable, although sulfuric acid may be used. The acidity of the solution should not be so high that a uranous iodate precipitate will not form or so low that the uranium or plutonium values will precipitate as the hydroxides, uranate or plutonate. A preferred range of acidity is between about 1 and 6 N for hydrochloric acid or for other acids. It is desirable to provide a sufficient contact time or digestion period to insure adequate carrying of the plutonium. The digestion may be effected at room temperature with a contact time or precipitate digestion time of ten to ninety minutes and preferably thirty to sixty minutes. The carrier may then be separated from the supernatant solution by any suitable means, such as decantation, filtration, or centrifugation. Centrifugation has been found to be the preferable method.

The uranous iodate carrier may be dissolved in cold concentrated nitric acid without oxidation of the uranous ion. One of the great advantages of this process is the substantial concentration of plutonium that may be effected by carrying the plutonium from a solution with a uranous iodate carrier and then dissolving the carrier by oxidizing the carrier cation from the uranous to the uranyl state. One method of accomplishing this oxidation of the uranous cation is by contacting the carrier with warm concentrated nitric acid. Uranous iodate will normally be oxidized in five minutes in concentrated $HNO_3$ at 80° C. The temperature is not critical and other temperatures may be used with a corresponding increase or reduction of the time required to effect the oxidation. Other standard methods of effecting the oxidation and dissolution of the salt may be used. More than 1,000 grams of the uranyl iodate monohydrate will dissolve in 100 milliliters of cold water so that the effectiveness of this method as a concentration step will be readily apparent.

The presence of ferrous ion will inhibit the precipitation of $U(IO_3)_4$ to a certain extent and decrease its carrying power for plutonium. It is therefore desirable that the solution from which the precipitation is carried out be substantially free of ferrous ion.

Now that the process of this invention has been described, the process may be further illustrated by the following examples.

Example I

A 6 N hydrochloric acid solution containing 150 mg. of $Bi^{+3}$/cc. as $BiPO_4$ was formed. A tracer amount of $Pu^{+4}$ as the nitrate was added to this solution. A uranous salt was then added to the solution to make the $U^{+4}$ concentration 1 mg./cc. and the solution was made 0.4 M in iodate ion. The uranous iodate plutonium-containing precipitate which was thus formed was digested for ten minutes and then separated from the solution by centrifugation. Radiometric analysis of the precipitate disclosed that 93% of the plutonium had been carried with the uranous iodate precipitate.

Example II

A second experiment was carried out under conditions identical with those under which Example I was performed, with the following exceptions: Concentration of the bismuth was 125 mg. $Bi^{+3}$/cc. and the solution was a 5 N hydrochloric acid solution. Radiometric analysis of the precipitate in this experiment showed that 96% of the plutonium was carried by the uranous iodate precipitate.

While there have been described certain embodiments of this invention, it is to be understood that it is capable of many modifications. Changes, therefore, may be made without departing from the spirit and scope of this invention as described in the appended claims, in which it is intended to claim all novelties and invention as broadly as possible in view of the prior art.

What is claimed is:

1. The method of separating plutonium in the reduced state from an aqueous acidic solution, which comprises incorporating into the solution a uranous iodate carrier precipitate and separating the plutonium-containing uranous iodate carrier precipitate from the solution.

2. The process of claim 1 wherein the plutonium is present in the tetravalent state.

3. The process of separating plutonium values in the reduced state from an aqueous acidic solution containing ions of a contaminant of the class $UO_2^{++}$, Cs, Rb, La, and the rare earths in the trivalent state, which comprises incorporating into the solution a uranous iodate carrier precipitate and separating the plutonium-containing uranous iodate carrier from the solution.

4. The process of claim 3 wherein the plutonium is present in the tetravalent state.

5. The process of claim 3 wherein the aqueous acidic solution is a hydrochloric acid solution.

6. The process of claim 3 wherein the aqueous acidic solution is a nitric acid solution.

7. The process of separating tetravalent plutonium values from ions of a contaminant of the class $UO^{+2}$, Cs, Rb, La, and rare earths in the trivalent state, which comprises forming an aqueous acidic solution of tetravalent plutonium and said contaminants wherein the acidity is between 1 and 6 N, adding to said solution a soluble source of uranous ions, a soluble source of iodate ion, and separating the uranous iodate plutonium-containing carrier precipitate thus formed from the solution.

8. The process of claim 7 wherein the aqueous acidic solution is a hydrochloric acid solution.

9. The process of claim 7 wherein the aqueous acidic solution is a nitric acid solution.

10. The method of concentrating plutonium, which comprises forming an aqueous acidic solution containing tetravalent plutonium ions, incorporating into said solution a uranous iodate carrier precipitate, separating the plutonium-containing uranous iodate carrier precipitate from said solution, adding an oxidizing agent to said carrier precipitate thereby oxidizing the uranous component of the precipitate to the uranyl state, and dissolving said resultant precipitate in an aqueous medium of smaller volume than the original solution.

11. The process of claim 10 wherein said oxidizing agent is warm concentrated nitric acid.

12. The process of claim 11 wherein the concentrated nitric acid has a temperature of 80° C.

References Cited in the file of this patent

Gmelin-Kraut: "Handbuch der anorganisch Chemie," vol. 3.1, page 1122 (1912).

AECD—1829, U.S. Atomic Energy Commission document dated March 19, 1942. Declassified December 18, 1947.

N-2205, "Summary of Plutomium Carrying Agents," January 16, 1946. Declassified November 22, 1957. Pages 1, 24, 41. Reports information taken from CN-979, September 30, 1943, and this date relied on.

Harvey at al.: "Journal of the Chemical Society," 1947, pages 1010–1021.

Seaborg et al.: "Journal of the American Chemical Society," vol. 70, pages 1128–34 (1948). Report submitted March 21, 1942.